Nov. 23, 1965  SADATOSHI INOUE ETAL  3,219,955
BEND FOR CIRCULAR WAVEGUIDE UTILIZING MODE
SUPPRESSING SUBDIVIDING PARTITIONS
Filed Nov. 6, 1963                                3 Sheets-Sheet 3

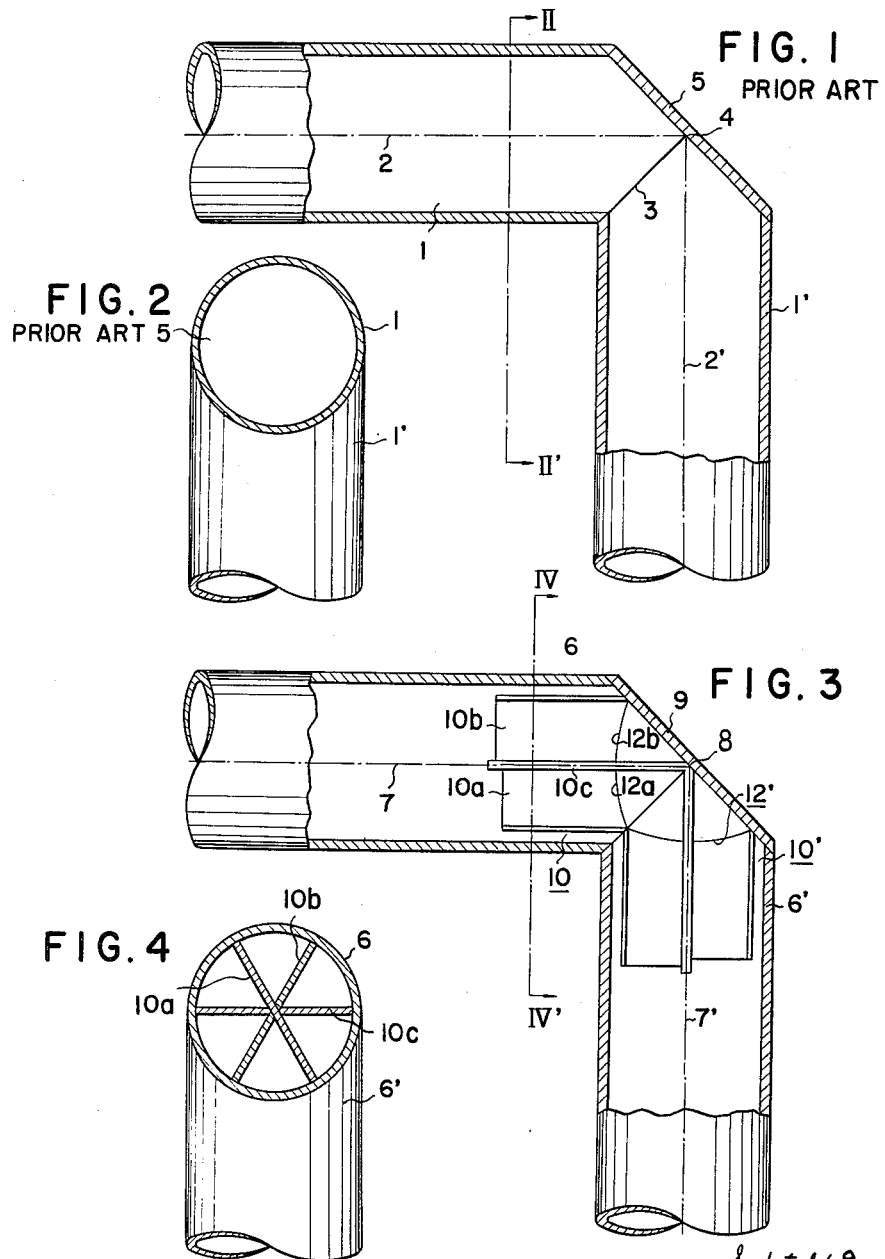

United States Patent Office 3,219,955
Patented Nov. 23, 1965

3,219,955
BEND FOR CIRCULAR WAVEGUIDE UTILIZING MODE SUPPRESSING SUBDIVIDING PARTITIONS
Sadatoshi Inoue, Setagaya-ku, Tokyo-to, Masakuni Wakui, Yokohama-shi, and Yasuto Mushiake and Saburo Adachi, Sendai-shi, Japan, assignors to Showa Densen Denran Kabushiki Kaisha, Kawasaki-shi, Japan, a joint-stock company of Japan, and Yasuto Mushiake and Saburo Adachi
Filed Nov. 6, 1963, Ser. No. 321,758
Claims priority, application Japan, Nov. 6, 1962, 37/48,622
28 Claims. (Cl. 333—98)

This invention relates to improvements in a bent-type circular waveguide, more particularly it relates to a bent-type circular waveguide in which, by providing radial conductors in said waveguide at the bent portion thereof, the said bent portion is prevented from excitation of an electromagnetic wave of an unnecessary mode and such excited unnecessary mode is absorbed.

In most cases of long distance transmission of electromagnetic energy, a circular waveguide which is excited in the mode of $TE_{01}$ is used. Such circular waveguide shows a favourable transmission characteristics when it is layed in straight. However, the waveguide can not always be installed in straight, but is sometimes required to be curved or bent with restrictions caused by topography of a place where it is to be installed or by construction of machinery with which it is to be connected.

Heretofore, in the case of manufacturing a bent-type circular waveguide, two pieces of conductor tube, each end of which being cut in slant, are connected at their slant faces and a reflecting plate is disposed on a plane including an intersection of the axes of the said both conductor tubes and vertically crossing with the line which divides equally the angle between the said axes.

However, such a bent-type circular waveguide has a drawback of creating a mode conversion loss by an excitation of an unnecessary mode of electromagnetic wave other than $TE_{01}$, such as, for instance, $TM_{11}$ mode, $TE_{on}$ mode ($n=2, 3, 4 \ldots$), etc. The electro-magnetic wave of these unnecessary modes, during its travel through the waveguide resumes the original $TE_{01}$ mode. In such a case, electric signal at a receiving side is gradually disturbed, because $TE_{01}$ mode and the unnecessary modes are different in their phase speed. In this consequence, it is desirable to remove as quickly as possible the electromagnetic waves in unnecessary modes which are created at the bent portion of the circular waveguide.

It is therefore an object of this invention to prevent occurrence of electromagnetic waves in unnecessary modes other than $TE_{01}$ mode and to reduce the mode conversion loss in a bent-type circular waveguide which is composed of two pieces of conductor tube, each end of which being cut in slant and said tubes being connected at their slant faces, and a reflecting plate secured on a plane including an intersection of the axes of the said both conductor tubes and vertically crossing with the line which divide equally the angle between the said axes.

It is another object of this invention to prevent disturbance of electric signal at a receiving side by absorbing an electromagnetic waves in unnecessary modes other than $TE_{01}$ mode in the above-mentioned bent-type circular waveguide.

The foregoing objects and other objects of this invention will become more apparent by reference to the following detailed explanations of the conventional bent-type circular waveguide as well as the same according to the present invention, taken in conjunction with the accompanying drawings in which:

FIG. 1 is a side view, partly in longitudinal section, of the conventional bent-type circular waveguide, which is shown for the sake of comparison with that of the present invention;

FIG. 2 is a sectional view of FIG. 1 cut along the line II–II′;

FIG. 3 is an embodiment of the bent-type circular waveguide according to the present invention, partly in longitudinal section, showing a portion of the conductor tube and a reflecting plate only;

FIG. 4 is a sectional view of FIG. 3 cut along the line IV–IV′;

Figure 5:
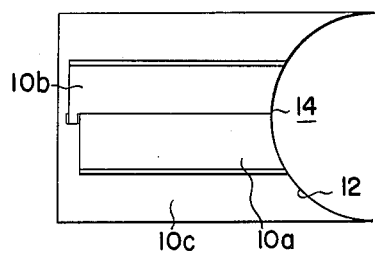
FIG. 5 is a side view of a radial conductor which is used in an embodiment of the bent-type circular waveguide according to this invention shown in FIGS. 3 and 4.
Figure 6A:
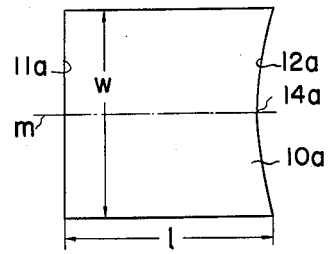
Figure 6B:
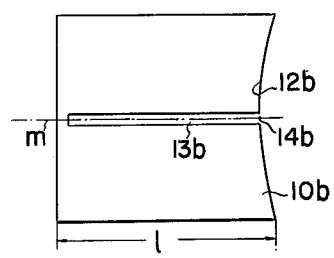
Figure 6C:
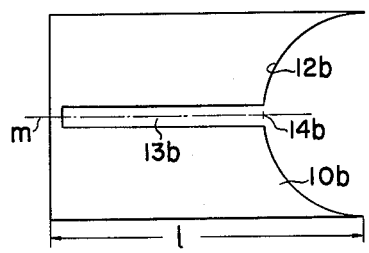
Figure 7:
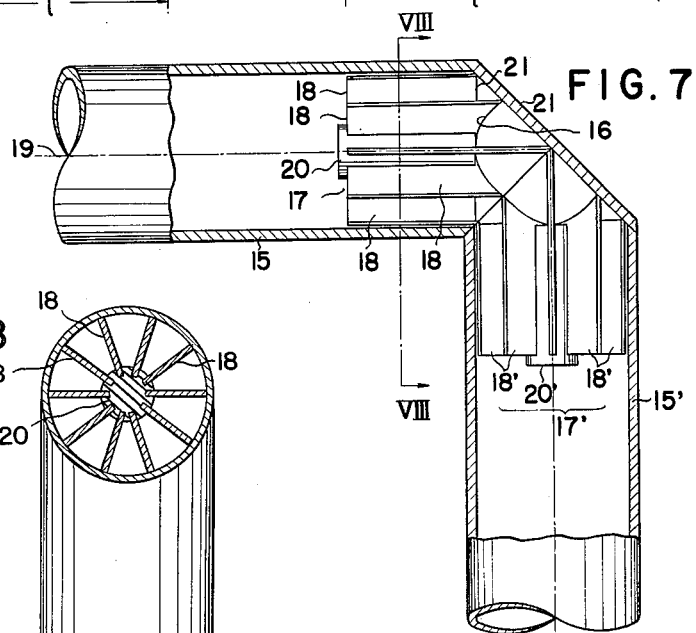
Figure 8:
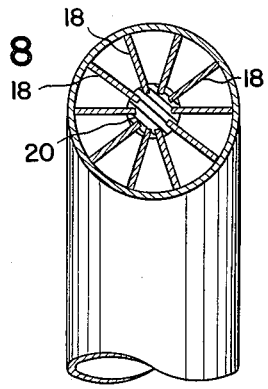
Figure 9:
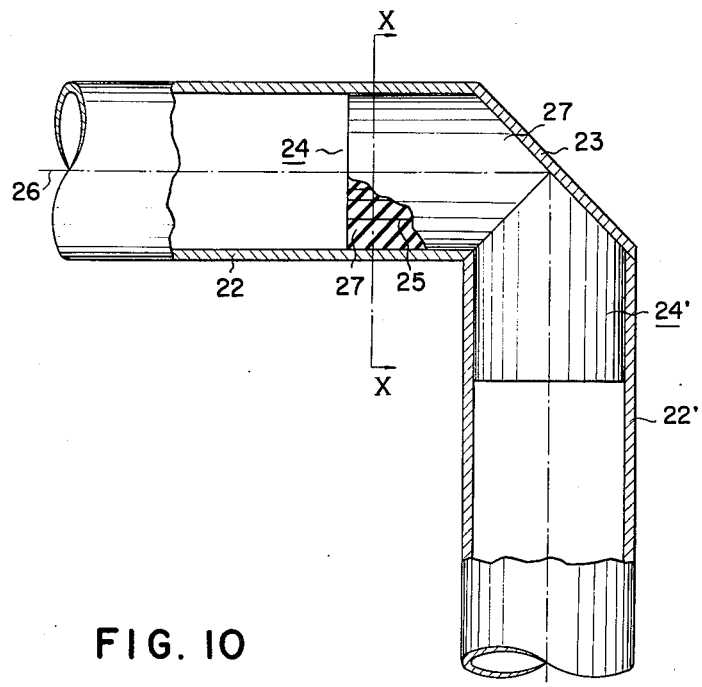
Figure 10:
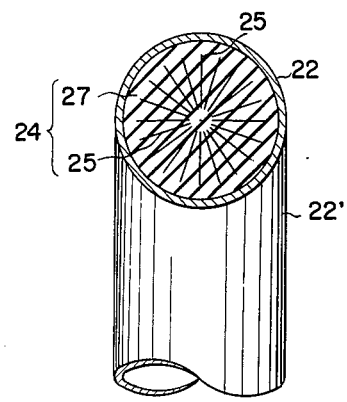

FIGS. 6(a), 6(b), and 6(c) are side views of each of the conductor plates composing the radial conductor as shown in FIG. 3 through FIG. 5;

FIG. 7 is a side view of another embodiment of the bent-type circular waveguide according to this invention, partly in longitudinal section;

FIG. 8 is a sectional view of FIG. 7 cut along the line VIII–VIII′;

FIG. 9 is still other embodiment of the bent-type circular waveguide according to the present invention, partly in longitudinal section; and FIG. 10 is a sectional view of FIG. 9 cut along the line X–X′.

Referring now to FIGS. 1 and 2, detailed explanations will be made in relation to the conventional bent-type circular waveguide.

Each end of a pair of conductor tubes 1, 1′ having equal bore is cut with inclination of substantially 45 degrees in relation to each tube axis 2, 2′. Both conductor tubes are then joined together at their inclined faces, the joint of the said tubes being indicated by the reference numeral 3. The conductor tubes 1, 1′ thus connected at substantially right angle are then severed at a plane including an intersecting point 4 of the axes 2, 2′ of these tubes and vertically crossing with the line dividing equally the angle between the said axes. Since this severed plane becomes elliptical face being equally inclined in relation to the conductor tubes 1, 1′, the said plane will hereinafter be called the "common elliptical plane." On the said common elliptical plane, a reflecting plate 5 is secured. In this conventional bent-type circular waveguide which is constructed in the above-mentioned manner, an electromagnetic wave in $TE_{01}$ mode entered from the side of the conductor tube 1 is reflected by the reflecting plate 5 and then directs to the conductor tube 1′. In this case, a resultant wave consisting of an incident wave and a reflected wave satisfies the boundary conditions on the reflecting plate 5, but as the end wall of the conductor tube 1 is severed by the tube wall of the conductor tube 1′ and does not exist, the incident wave does not fulfill the boundary conditions on this removed portion. Similarly, as the end wall of the conductor tube 1′ is severed by the wall of the conductor tube 1 and does not exist, the reflected wave does not satisfy the boundary conditions on this removed portion. As a result of this, the conventional bent-type circular waveguide has a defect such that the electromagnetic waves of unnecessary modes other than $TE_{01}$, as $TM_{11}$, $TE_{on}$ ($n=2, 3, 4 \ldots$) modes, etc., are excited and mode conversion loss is created.

Next, referring to FIG. 3 through FIG. 6 showing an embodiment of this invention, details of this invention will be explained.

The conductor tube composing a part of the bent-type circular waveguide according to this invention shown in FIGS. 3 and 4 is manufactured by exactly the same way as the conventional bent-type circular waveguide as shown in FIGS. 1 and 2, i.e., by joining together two conductor tubes 6, 6' at their slant faces formed by cutting each end of said tubes with an angle of 45 degrees, and by fixing a reflecting plate 9 on the common elliptical plane which is formed on a plane including an intersecting point 8 of the axes of the conductor tubes 7, 7' and vertically crossing with the line dividing equally the angle between the said axes. And, inside these conductor tubes 6, 6' thus constructed, radical conductors 10, 10' are provided. As the first radial conductor 10 and the second radial conductor 10' are exactly the same construction, the explanation hereinafter will be made on the first radial conductor 10 alone.

In this example, the radial conductor 10 comprises three conductor plates 10a, 10b, and 10c having width W being almost equal to the internal diameter of the bore of the conductor tube 6. On end face 11a in the direction of length $l$ of the first conductor plate 10a is plane, but the other end 12a thereof, as expressed in a curved face in FIG. 6, is so curved as to increase its length $l$ gradually according to the distance from the center line $m$ of the plate increases in the direction of the width W. And the curved face, as shown in FIG. 5, is constructed by a part of elliptic curve representing the same circular arc with the internal surface of the conductor tube 6' when it is viewed from the side with a deflected angle of 60 degrees.

The second conductor plate 10b is same with the first conductor plate 10a with the exception that the former is little longer than the latter and a slit 13b which opens toward the curved face 12b is provided along the center line $m$ of the said conductor plate 10b.

The third conductor plate 10c is relatively longer in length $l$ comparing with the preceding first and second conductor plates 10a, 10b, as well as is fairly longer and wider in the dimensions of the slit 13c comparing with that of the second conductor plate 10b.

Contrary to the fact that the curved faces 12a, 12b of the first and second conductor plates 10a, 10b are respectively shaped by a part of elliptical curve, the curved face 12c of the third conductor plate 10c is formed by a semicircular arc which is identical with the radius of the internal surface of the conductor tube 6'.

The center line $m$ of the first conductor plate 10a coincides with that of the second conductor plate and the plate face of the first conductor plate 10a, i.e., a plane parallel to a plane which includes the center line $m$ and the line indicating the width W, is inserted into the slit 13b of the second conductor plate 10b so as to have a deflected angle of 60 degrees to the plate face of the second conductor plate 10b. Similarly, the first and second conductor plates 10a, 10b are inserted into the slit 13c of the third conductor plate 10c in such a manner that the center lines $m$ of the conductor plates 10a, 10b may coincide with each other and the plate faces of the said plates may include a deflected angle of 60 degrees. Thus, the intersections 14a, 14b, and 14c of the respective center lines $m$ of the three conductor plates 10a, 10b and 10c and the imaginary extension plane of the curved faces 12a, 12b and 12c are converged in one point 14. In this consequence, the curved face 12 of the radial conductor 10 is represented by a curve of semi-circular arc as shown in FIG. 5 which is a side view of the radial conductor 10 composed of the said conductor plates 10a, 10b, and 10c. The first radial conductor 10 constructed in the above manner is accommodated in the first conductor tube 6 so that its curved face 12 faces to the reflecting plate 9, the center line $m$ of each conductor plate coincides with the axis 7 of the first conductor tube 6, and the plate surface of the third conductor plate 10c may vertically cross with the plane including axes 7, 7' of both conductor tubes 6, 6'. Accordingly, as best illustrated in FIG. 4, six conductor pieces extending in the axial direction of the conductor tube radially project from the tube axis 7 in the first conductor tube 6. Also, the curved face 12 of the radial conductor 10 which is constructed by the said six conductor pieces coincides with the imaginary extension plane of the internal surface of the second conductor tube 6'. Similarly, in the second conductor tube 6', the radial conductor 10' is fitted, and the curved face 12' of the second radial conductor 10' coincides with the imaginary extension plane of the wall of the first conductor tube.

Now considering a case in which an electromagnetic wave in the mode of $TE_{01}$ enters into the first conductor tube 6 of the bent-type circular waveguide which is constructed in the abovementioned manner, this electromagnetic wave is reflected by the reflecting plate 9 and transmitted to the second conductor tube 6', and in the part where the wall of the first conductor tube 6 does not exist by being severed by the second conductor tube 6', the curved face 12' of the second radial conductor 10' exists, which functions as the tube wall; and also the curved face 12 of the radial conductor 10 functions as the extension plane of the wall of the conductor tube 6' in relation to an electromagnetic wave which is reflected at the reflecting plate 9 and proceeds in the direction of the second conductor tube 6', so that excitation of the electromagnetic wave in unnecessary modes becomes negligible.

Since no radial component of electric field exists in the electromagnetic wave of $TE_{01}$ mode, the mode conversion loss does not occur practically even if the radial conductor is installed in the conductor tube so far as the plate to be used for the radial conductor is thin.

Contrary to this, as electromagnetic waves in other modes than $TE_{01}$ mode such as, for instance, $TM_{11}$, $TE_{0n}$ ($n=2, 3, 4 \ldots$) modes contain radial component of electric field, they are easily absorbed by the radial conductor.

In this way, the radial conductor of the bent-type circular waveguide according to this invention prevents the electromagnetic wave in the mode of $TE_{01}$ from being converted into unnecessary mode of electromagnetic wave and is able to filter immediately the unnecessary modes of the electromagnetic wave when such unnecessary modes occur. Accordingly, the present invention is able to provide a bent-type circular waveguide having less mode conversion loss and satisfactory transmission characteristics.

Referring to FIGS. 7 and 8, another embodiment of the bent-type circular waveguide of the present invention will now be explained hereinbelow.

The bent-type conductor tube for this embodiment, as in the case of the initial embodiment of this invention shown in FIGS. 3 and 4, consists of two conductor tubes 15, 15' and a reflecting plate 16 disposed on the common elliptical plane of the said conductor tubes, and a first radial conductor 17 is fitted inside the first conductor tube 15.

The first radial conductor 17 is constructed by implanting on the dielectric shaft 20 ten pieces of conductor plate 18 having somewhat shorter breadth than the radius of the tube bore of the conductor tube 15 so that they may project in the radial direction from the axis 19 of the conductor tube. The end surface 21 of the said radial conductor 17 on the side of the reflecting plate 16 is so curved as to coincide with the imaginary extension plane of the internal wall of the second conductor tube 15'. Similarly, in the second conductor tube 15', the second radial conductor 17' is fitted.

The bent-type circular waveguide of this embodiment constructed in the above-mentioned manner also has the effects of causing less mode conversion loss as well as absorbing unnecessary modes of the electromagnetic wave.

Still other embodiment according to the present invention will be explained in the following in reference to FIGS. 9 and 10.

The bent-type conductor tube, as in the case of the prior embodiment of this invention shown in FIGS. 3 and 4, consists of two pieces of conductor tube 22, 22' and a reflecting plate 23 disposed on the common elliptical plane of the conductor tube, and the first radial conductor 24 is fitted in the first conductor tube 22. And the first radial conductor 24 is constructed by many conductor foils 25 being moulded in the dielectric substance, such as plastics or the like, so that they may project radially from the tube axis 26. The end surface of this radial conductor 24 on the side of the reflecting plate 23 is so curved as to coincide with the imaginary extension plane of the internal wall of the second conductor tube 22′. Similarly, in the second conductor tube 22′, a second radial conductor 24′, which is shaped as same as the first radial conductor 24, is provided.

The bent-type circular waveguide of this embodiment which is constructed in the above-mentioned way has also the same functions and effects as those of the said first embodiment.

Although the present invention has been described in connection with the three particular embodiments of the bent-type circular waveguide, it is to be understood that the scope of this invention is not to be limited to these examples.

And as is apparent from the foregoing explanations, there is no restriction of shape and number of the conductor plates for the radial conductor to be fitted in the bent-type conductor tube according to this invention, so far as they project radially from the axis of the conductor tube in which the radial conductor is to be fittted and the end surface of the conductor plate on the side of the reflecting plate coincides with the imaginary extension plane of the internal surface of the opposite conductor tube. And the more the number of conductor plate or conductor foil increases, the less the mode convention loss becomes However, on the other hand, when the number of conductor plate or conductor foil increases too many, the resistance loss due to electric current flowing through each conductor plate or foil becomes innegligible. Therefore, it is necessary that the number of the conductor plate or foil should be properly determined to obtain the optimum results. It should also be noted that the conductor plate or conductor foil according to this invention displays the maximum effect in case the plate surface vertically crosses with the plane formed by the axes of the two conductor tubes. Therefore, when the radial conductor composed of one piece of conductor plate or conductor foil is utilized, it is desirable to accommodate the radial conductor so that its plate face may vertically cross with the plane formed by the axes of the two conductor tubes.

Also, it goes without saying that when the radial conductor is supported in the conductor tube, the method is not always restricted to the three particular means as shown in the foregoing examples, but various well-known methods can be adopted.

Of course, electroconductive contact of internal wall of the conductor tube with radial end edge of the radial conductor disposed in said internal wall is preferable, but, if necessary, said internal wall and radial end edge may be electrically insulated.

The conductor tube and the reflecting plate to be used in this invention can be made of copper, silver, aluminium or other metals having good electric conductivity; or they can be made of metals, glass, inorganic material or synthetic resins being properly selected, and internal surface of the conductor tube and the reflecting plate made of one of such dielectric material can be coated with copper, silver or other metals having good electric conductivity by means of plating, evaporation, sputtering or the like.

Moreover, the radial conductor to be used in this invention can be constituted with plate or foil of copper, silver or other metals having good electric conductivity, or can be made by coating the surface of synthetic resin or other dielectric material with copper, silver or other metals of good electric conductivity by means of plating, evaporation, sputtering or the like.

Further, it should be noted that the most desirable angle of bending the conductor tube for the circular waveguide of this invention is the right angle in view of minimizing the cutting length of the tube wall. However, as it is possible to obtain substantially same functions and effects with any angle near right angle, the present invention may be modified within the scope of the appended claims.

What is claimed is:

1. A circular waveguide bend comprising a bent-type conductor tube consisting of a pair of conductor tubes, joined together at one end of each tube, said one end being cut at an angle of about 45 degrees to the axis of the respective tube and said tubes being connected at their slant faces, a reflecting plate disposed on a plane including an intersection of the axes of the said both conductor tubes and vertically crossing the line bisecting the angle between the said axes, and a pair of radial conductors accommodated in each of said conductor tubes, each of said radial conductors being made to extend in the axial direction of the respective conductor tubes and project in the radial direction of the conductor tube, and the end surface of each of said radial conductors extending to the side of the said reflecting plate and being shaped to coincide with the imaginary cylinder which is the extension of the internal surface of the opposite conductor tube.

2. A bent-type circular waveguide as described in claim 1 in which each radial conductor is formed by one conductor plate.

3. A bent-type circular waveguide as described in claim 2 in which the plate face of the conductor plate includes the axis of the conductor tube into which it is inserted and faces in the direction vertically crossing the plane formed by the axes of both conductor tubes.

4. A bent-type circular waveguide as described in claim 1 in which the radial conductor is composed of a plurality of conductor plates.

5. A bent-type circular waveguide as described in claim 2, in which the radial conductor is composed of the conductor plates and dielectric material which moulds the said conductor plates.

6. A bent-type circular waveguide as described in claim 3, in which the radial conductor is composed of the conductor plates and dielectric material which moulds the said conductor plates.

7. A bent-type circular waveguide as described in claim 4, in which the radial conductor is composed of the conductor plates and dielectric material which moulds the said conductor plates.

8. A bent-type circular waveguide as described in claim 2, in which the conductor plates are radially implanted on the shaft of the dielectric material.

9. A bent-type circular waveguide as described in claim 3, in which the conductor plates are radially implanted on the shaft of the dielectric material.

10. A bent-type circular waveguide as described in claim 4, in which the conductor plates are radially implanted on the shaft of the dielectric material.

11. A bent-type circular waveguide as described in claim 5, in which conductor foils are used in place of the conductor plates.

12. A bent-type circular waveguide as described in claim 6, in which conductor foils are used in place of the conductor plates.

13. A bent-type circular waveguide as described in claim 7, in which conductor foils are used in place of the conductor plates.

14. A bent-type circular waveguide as described in claim 8, in which conductor foils are used in place of the conductor plates.

15. A bent-type circular waveguide as described in claim 9, in which conductor foils are used in place of the conductor plates.

16. A bent-type circular waveguide as claimed in claim 10, in which conductor foils are used in place of the conductor plates.

17. A bent-type circular waveguide as described in claim 5, in which the conductor plates are made of dielectric material which is coated with a metal of good electric conductivity.

18. A bent-type circular waveguide as described in claim 6, in which the conductor plates are made of dielectric material which is coated with a metal of good electric conductivity.

19. A bent-type circular waveguide as described in claim 7, in which the conductor plates are made of dielectric material which is coated with a metal of good electric conductivity.

20. A bent-type circular waveguide as described in claim 8, in which the conductor plates are made of dielectric material which is coated with a metal of good electric conductivity.

21. A bent-type circular waveguide as described in claim 9, in which the conductor plates are made of dielectric material which is coated with a metal of good electric conductivity.

22. A bent-type circular waveguide as described in claim 10, in which the conductor plates are made of dielectric material which is coated with a metal of good electric conductivity.

23. A bent-type circular waveguide as described in claim 1, in which the conductor tube is made of a metallic material having good electric conductivity.

24. A bent-type circular waveguide as described in claim 1, in which reflecting plate is made of a metallic material having good electric conductivity.

25. A bent-type circular waveguide as described in claim 1, in which the conductor tube is made of a material selected from the group consisting of metallic materials of low electric conductivity, inorganic materials, synthetic resins, and other similar materials, the surface of which being coated with a metallic material having good electric conductivity by means of plating, evaporation, sputtering and the like.

26. A bent-type circular waveguide as described in claim 1, in which the reflecting plate is made of a material selected from the group consisting of a metallic material of low electric conductivity, inorganic materials, synthetic resins, and other similar materials, the surface of which being coated with a metallic material having good electric conductivity by means of plating, evaporation, sputtering and the like.

27. A bent-type circular waveguide as described in claim 1, in which the internal wall of the conductor tube and the radial end edge of the radial conductor disposed in said internal wall are electroconductivity contracted with each other.

28. A bent-type circular waveguide as described in claim 1, in which the internal wall of the conductor tube and the radial end edge of the radial conductor disposed in said internal wall are electrically insulated from each other.

References Cited by the Examiner

UNITED STATES PATENTS

| | | | |
|---|---|---|---|
| 2,760,171 | 6/1956 | King | 333—98 |
| 2,848,690 | 8/1958 | Miller | 333—98 |
| 2,899,651 | 8/1959 | Lanciani | 333—98 |
| 3,010,088 | 11/1961 | Kahn | 333—98 |

FOREIGN PATENTS 1,053,597   3/1959   Germany.

OTHER REFERENCES

Barlow: Propagation of the Ho1 Low-Loss Wave Mode Around Bends in Tubular Metal Waveguides, The Institution of Electrical Engineers (Proceedings), London, vol. 104 Part B, No. 16, July, pages 403–409 relied on.

Harvey: Microwave Engineering, London, copyright 1963, pages 1043–1049 relied on.

HERMAN KARL SAALBACH, *Primary Examiner.*